(12) United States Patent
Tung et al.

(10) Patent No.: US 7,443,071 B2
(45) Date of Patent: Oct. 28, 2008

(54) MOTOR STATOR

(75) Inventors: Chao-Nien Tung, Guangdong (CN);
Chuen-Shu Hou, Guangdong (CN);
Chih-Hao Yang, Guangdong (CN);
Lung-Wei Huang, Guangdong (CN)

(73) Assignee: Foxconn Technology Co., Ltd.,
Tu-Cheng, Taipei Hsien (TW)

( * ) Notice: Subject to any disclaimer, the term of this patent is extended or adjusted under 35 U.S.C. 154(b) by 409 days.

(21) Appl. No.: 11/308,533

(22) Filed: Apr. 4, 2006

(65) Prior Publication Data
US 2006/0279157 A1 Dec. 14, 2006

(30) Foreign Application Priority Data
Jun. 10, 2005 (CN) .......................... 2005 1 0035293

(51) Int. Cl.
*H02K 7/00* (2006.01)
(52) U.S. Cl. ........................................ 310/216; 310/254
(58) Field of Classification Search ................... 310/44, 310/216–218, 254, 258, 259
See application file for complete search history.

(56) References Cited

U.S. PATENT DOCUMENTS

| 6,081,056 | A * | 6/2000 | Takagi et al. .................... 310/89 |
| 2006/0273670 | A1* | 12/2006 | Tung et al. ................. 310/67 R |
| 2006/0279157 | A1* | 12/2006 | Tung et al. ................... 310/216 |
| 2006/0280944 | A1* | 12/2006 | Tung et al. ................... 428/403 |
| 2007/0075598 | A1* | 4/2007 | Tung et al. ................. 310/67 R |
| 2008/0055764 | A1* | 3/2008 | Fujii et al. ................ 360/73.03 |

FOREIGN PATENT DOCUMENTS

| CN | 2566523 Y | 8/2003 |
| CN | 1525622 A | 9/2004 |
| TW | 245670 | 10/2004 |

* cited by examiner

*Primary Examiner*—James Harvey
(74) *Attorney, Agent, or Firm*—Winston Hsu

(57) ABSTRACT

A motor stator includes a stator core (500) and a stator coil. The stator core includes a central cylinder (501) and a plurality of posts (503) extending from the central cylinder. Each post is connected with a magnetic pole (505). The post has a smaller height than the central cylinder and the magnetic pole whereby a recess (507) is formed above the post between the central cylinder and the magnetic pole. The stator coil is received in the recess and wound around the post. The stator core is integrally made from ferromagnetic powder by powder metallurgy technique. Each particle of the powder includes an inner core (12) made of magnetic material and an outer shell (14) surrounding the inner core. The shell has a higher electrical resistance than the inner core.

14 Claims, 7 Drawing Sheets

MOTOR STATOR

CROSS-REFERENCES TO RELATED APPLICATION

Relevant subject matter is disclosed in copending U.S. patent application filed on the same date and having a same title with the present application, and copending U.S. patent application filed on the same date and having a title "ferromagnetic powder for dust core", both of which are assigned to the same assignee with the present application. These applications have been assigned application Ser. Nos. 11/308,600 and 11/308,530, respectively.

FIELD OF THE INVENTION

The present invention relates generally to motors, and more particularly to an integrally formed stator for use in a brushless motor, such as a fan motor.

DESCRIPTION OF RELATED ART

It is well known that rotary motors are widely used to drive devices such as cooling fans, hard disc drives, etc. A rotary motor includes therein two important components—stator and rotor. The rotor rotates relative to the stator due to a magnetic interaction between them. For example, in a computer system, a fan motor is used to drive an impeller of a cooling fan so as to produce airflows flowing towards a heat generating electronic component such as a central processing unit (CPU) whereby the CPU is cooled. The impeller is affiliated to the rotor of the fan motor and moves continuously to generate the airflows due to rotation of the rotor.

A stator of a particular fan motor is shown in FIG. 5. The stator includes a stator core made of a plurality of laminated silicon steel sheets 100 and a plurality of stator coils 200 wound around the stator core. Upper and lower insulating frames 301, 302 are interposed between the stator core and each of the stator coils 200.

As the silicon steel sheets 100 are stacked together, a plurality of T-shaped yokes is formed, as shown in FIG. 6, wherein each yoke includes a post 401 on which a stator coil 200 is wound and an arc-shaped magnetic pole 402 at a free end of the post 401. When the stator coil 200 is wound around the post 401, the stator coil 200 should not exceed a height of the upper (or lower) insulating frame 301 (302). The stator core of this configuration has greatly restricted the number of turns in each coil 200, given the current trend towards miniaturization for fan motors. Furthermore, in assembly, it is difficult to align the silicon steel sheets 100 precisely with each other. Moreover, small gaps are inevitably formed between adjacent silicon steel sheets 100, which may cause a discontinuous magnetic circuit for the stator core and accordingly a magnetic flux leakage problem.

Taiwanese Patent Application No. 092217135 discloses another kind of stator whose stator core includes only two silicon steel sheets 101 and 102 stacked together, as shown in FIG. 7. This kind of stator enables application of a stator coil 200 having a greater number of turns of copper wire. However, as being constructed also from silicon steel sheets 101, 102, the stator inherits accordingly the aforementioned problems, such as, difficulty in assembly and discontinuous magnetic circuit. Furthermore, this kind of stator lacks freedom for the design of its magnetic poles.

In the above-mentioned stators, the silicon steel sheets 100 (101, 102) for the lamination stator cores are typically prepared by stamping silicon steel sheets, in which case the material yield is extremely low since waste material is unavoidable from the stamping operation.

Therefore, it is desirable to provide a motor stator wherein one or more of the foregoing disadvantages may be overcome or at least alleviated.

SUMMARY OF INVENTION

The present invention relates to a motor stator for use in a brushless motor such as a fan motor. The motor stator includes an integrally formed stator core and a stator coil wound on the stator core. The integral stator core includes a central cylinder and a plurality of posts extending radially outwardly from the central cylinder. Each of the posts is connected with a magnetic pole at a free end thereof. The post has a smaller height dimension than the central cylinder and the magnetic pole whereby a recess is formed above the post between the central cylinder and the magnetic pole. The stator coil is received in the recess and is wound around the post. The stator core is integrally made from a ferromagnetic powder by powder metallurgy technique.

In an example, a particle of the ferromagnetic powder for the stator core has a core-shell structure, which includes a central core and an outer shell coated on the central core. The central core is made of a magnetic material and is used for providing magnetic property for the stator core. The outer shell has a higher electrical resistance than the central core and is used for increasing insulation and enhancing interconnection between particles of the ferromagnetic powder.

Other advantages and novel features of the present invention will become more apparent from the following detailed description of preferred embodiment when taken in conjunction with the accompanying drawings, in which:

DETAILED DESCRIPTION

Figure 1:
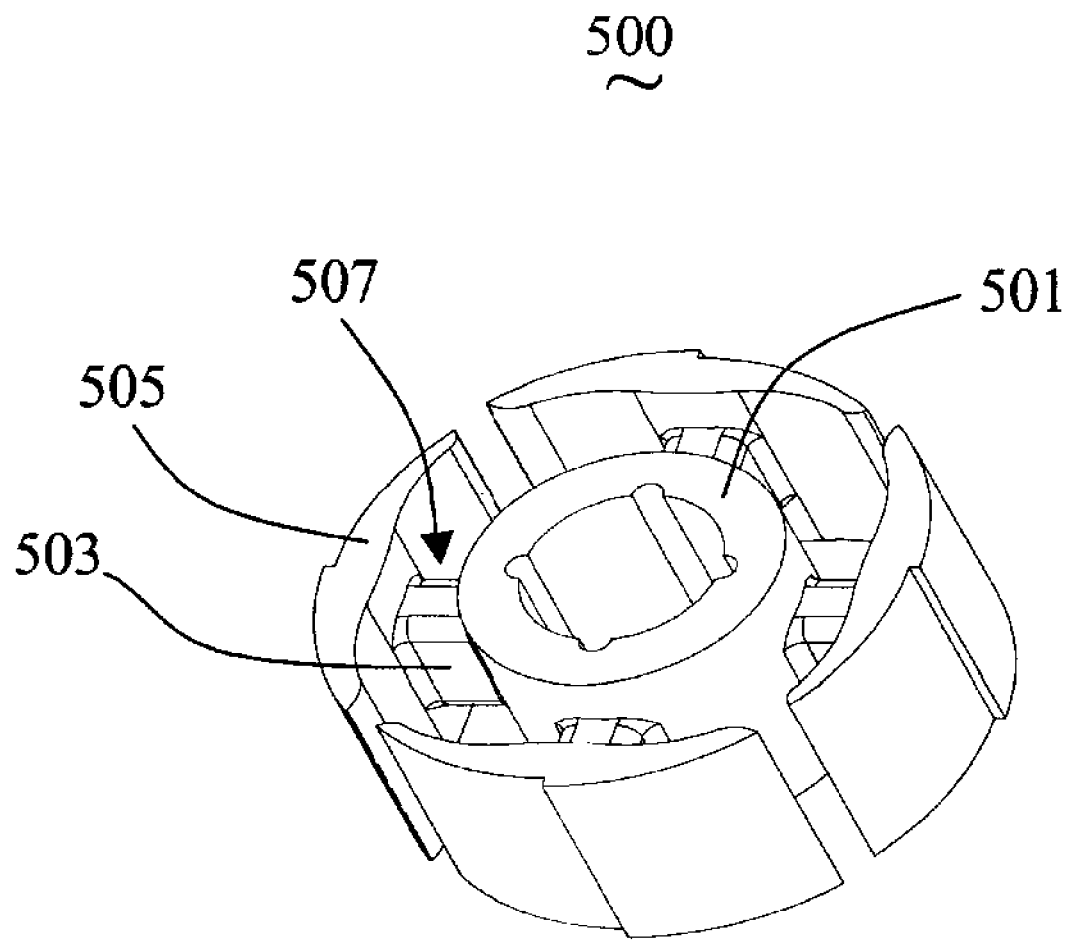
FIG. 1 is an isometric view of a stator core in accordance with an embodiment of the present invention.

FIG. 1 illustrates an integrally formed stator core 500 in accordance with an embodiment of the present invention. The stator core 500 is of a unitary, one-piece configuration, which includes a central cylinder 501, a plurality of radial posts 503 and a plurality of magnetic poles 505. The central cylinder 501 operates to receive shaft and bearings (or sleeve) of a brushless motor of which the stator core 500 is a part. The stator core 500 is slotted to define these radial posts 503. The posts 503, evenly spaced apart from each other, extend radially outwardly from an outer periphery of the central cylinder 501. After being wound with stator coils (not shown), the stator core 500 can be suitably used as a motor stator for the brushless motor, such as a fan motor. Typically, the stator coils are respectively wound on these posts 503.

The magnetic poles 505, which are intended to magnetically interact with a permanent magnet mounted on a rotor of the brushless motor, are formed at free ends of the posts 503, respectively. Each of the magnetic poles 505 has an arc-shaped configuration and extends away from a respective post 503 along opposite directions. The magnetic pole 505 has a cross-section with a size gradually decreasing from a middle portion thereof adjacent to the corresponding post 503 towards opposite ends of the magnetic pole 505.

Each of the posts 503 has a much smaller height dimension than the central cylinder 501 and the corresponding magnetic pole 505 such that a downward recess 507 is formed above the post 503 between the central cylinder 501 and the corresponding magnetic pole 505. As the stator coils are wound on the stator core 500, a greater number of turns in each coil are capable of being wound on the post 503 due to the presence of the recess 507. In other words, the stator core 500 of the illustrated configuration wherein the height dimension of the post 503 is smaller than the height dimension of the magnetic pole 505 enables utilization of stator coil having more turns of copper wire, without the requirement of increasing the size of the motor stator. In order to electrically insulate the stator coils from the stator core 500, upper and lower insulating frames are interposed between the stator core 500 and each of the stator coils. Alternatively, an outer surface of the stator core 500 is coated with a layer of insulating material, in which case the upper and lower insulating frames are not required, thereby lowering down cost for the stator core 500.

Figure 2:
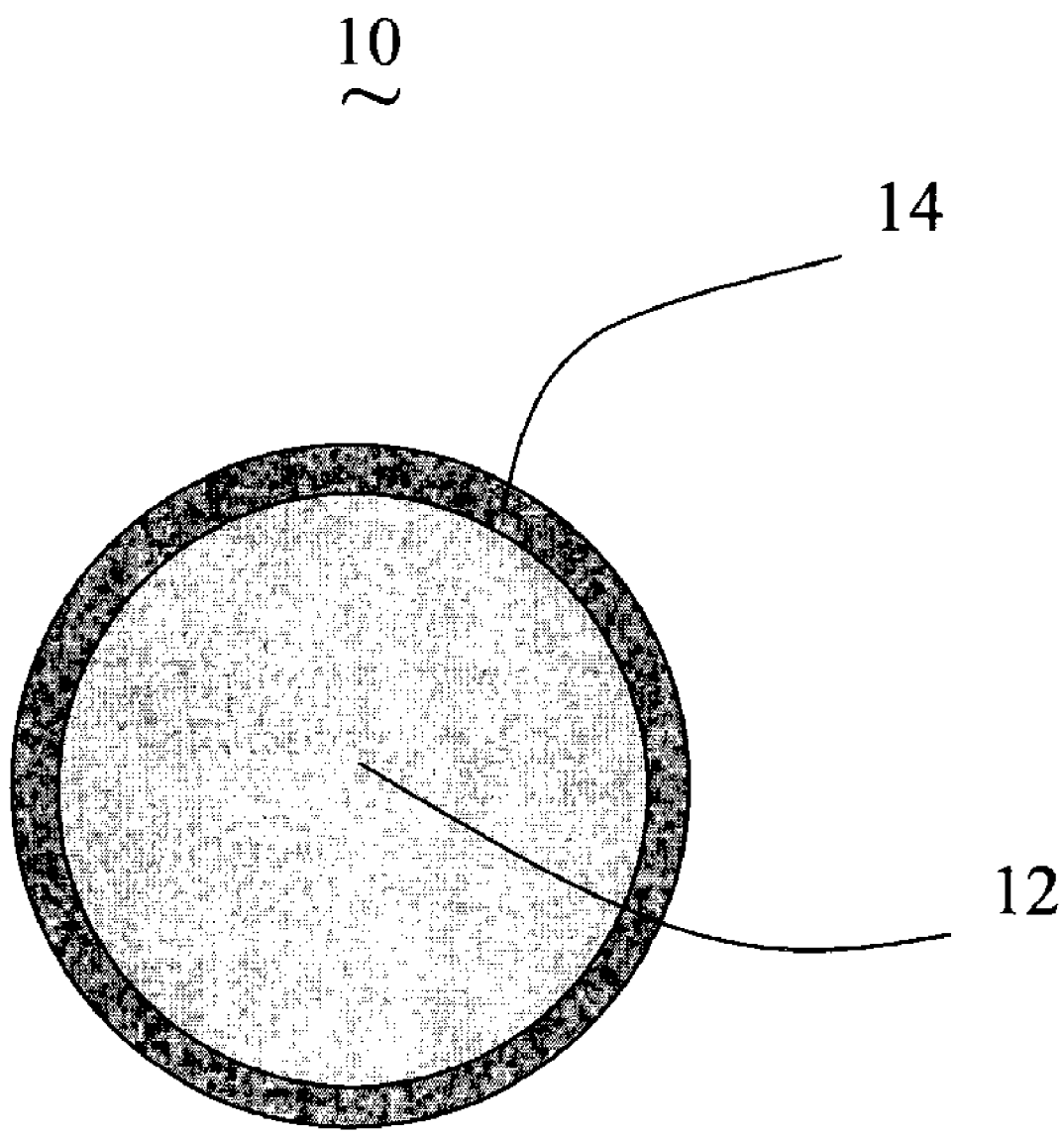
FIG. 2 is a schematic representation of a particle of ferromagnetic powder suitable for production of the stator core of FIG. 1.

The integral stator core 500 can be integrally made from a ferromagnetic powder by powder metallurgy technique, which is a process of making parts by pressing powdered particles in die presses. FIG. 2 schematically illustrates a particle 10 of a ferromagnetic powder which is suitable for forming the stator core 500. The particle 10 has a core-shell structure, which includes an inner core 12 made of magnetic material and an outer shell 14 covering the core 12. The shell 14 is a thin insulating layer coated on an outer peripheral surface of the core 12. The shape of the particle 10 is subject to no limitations, which may be spherical, flat or other suitable shapes. The average diameter for the particle 10 is 5 to 150 μm if the particle 10 is spherical.

The magnetic material used for the core 12 is typically selected from a soft magnetic material of high magnetic permeability and low magnetic loss, such as soft magnetic metals, amorphous iron-based magnetic powder, pure iron powder, iron-based powder compositions, soft magnetic non-metals and the like. For example, magnetic powder such as iron, sendust, ferrosilicon, permalloy, supermalloy, iron nitride, iron-aluminum alloys and iron-cobalt alloys may be suitable for the core 12. Among these magnetic materials mentioned above, iron or iron-based powder compositions having high saturation magnetization is preferred when the powder is used to prepare the stator core 500 as a substitute for the laminated stator core prepared from silicon steel laminations currently widely employed in fan motors.

The shell 14 of the particle 10 is made from such materials as to enable the shell 14 to have an electrical resistance that is higher than that of the core 12 for the purpose of reducing an eddy current loss associated with the ferromagnetic powder. In particular embodiments, such materials include, without limitation, metal composites and piezoelectric materials.

As an example, the particle 10 with the core-shell structure is prepared by employing a diffusion/precipitation mechanism, based on powder sintering process. Specifically, the soft magnetic material for the core 12 such as iron is melted firstly and the coating material as used to form the shell 14 is then added to the melted magnetic material to form a mixture. By using an atomizing or pulverization method, small powder is then prepared from the mixture. Then the powder is sintered at high temperature (e.g., in the range of about 300 to 900° C.) to cause the coating material contained in the powder to become supersaturated and accordingly precipitate out from the magnetic material of the powder. The magnetic material forms as the core 12 for the particle 10 and the precipitated coating material forms as the shell 14 for the particle 10.

In another example, the core 12 is previously obtained by, for example, an atomizing method from a soft magnetic material such as iron. A thin layer of film having a higher electrical resistance than the core 12 is then deposited on the outer surface of the core 12, wherein the film is provided as the shell 14. Such deposition method may be physical vapor deposition (PVD) or chemical vapor deposition (CVD). The material used for depositing of the film may be ferrites, piezoelectric materials, ferroelectric materials or ceramic materials.

Figure 3:
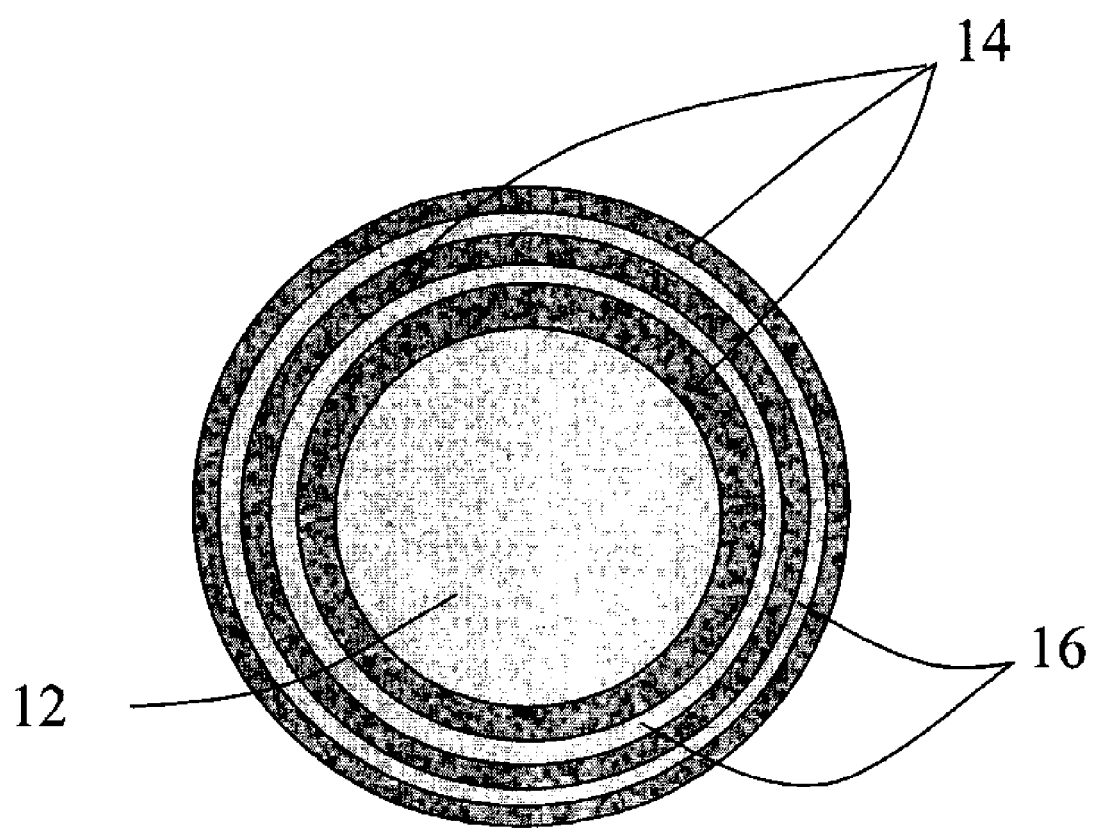
FIG. 3 is a schematic representation showing an alternative example of a particle of the ferromagnetic powder.

FIG. 3 schematically illustrates an alternative example of the ferromagnetic powder, in which a particle 10a of the ferromagnetic powder have a multi-layer structure. As shown in this example, the particle 10a includes a central core 12 and multiple layers of shells 14 concentrically surrounding the central core 12. Every two adjacent shells 14 are spaced apart by a magnetic layer 16 made of magnetic material. The outmost part of the particle 10a is a shell layer 14. The material for the magnetic layers 16 includes soft magnetic metals, amorphous iron-based magnetic powder, pure iron powder and composites thereof, soft magnetic non-metals and the like. In some embodiments, the core 12 and the magnetic layers 16 are made of the same magnetic material.

Figure 4:
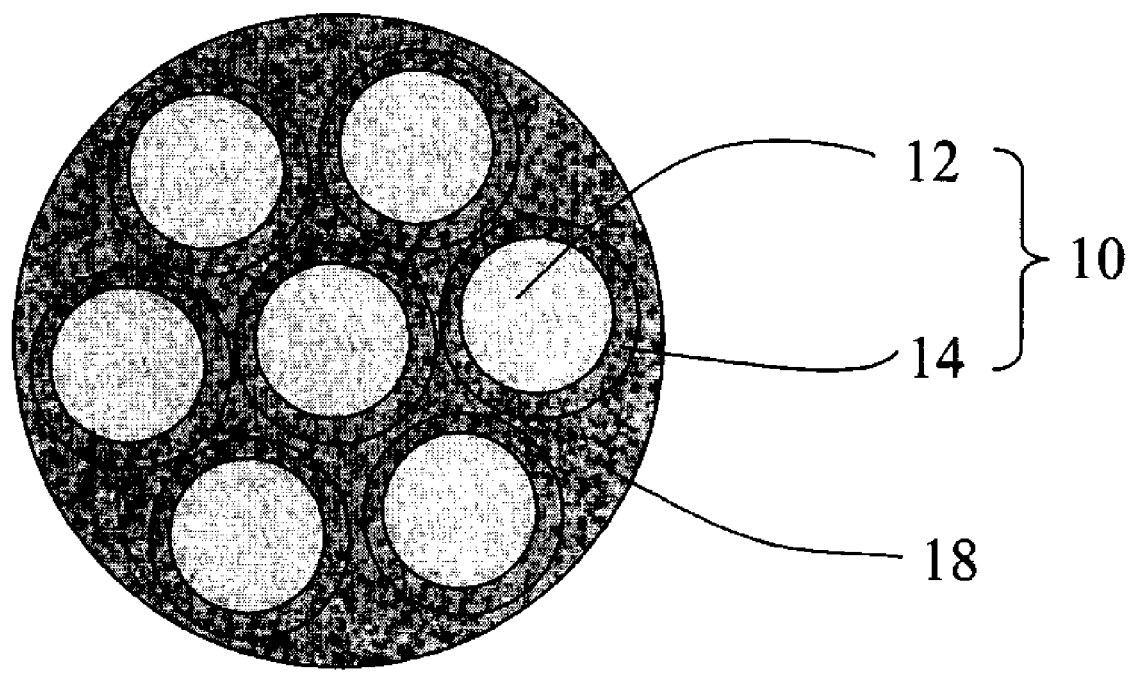
FIG. 4 is a schematic representation showing another example of a particle of the ferromagnetic powder.
Figure 5:
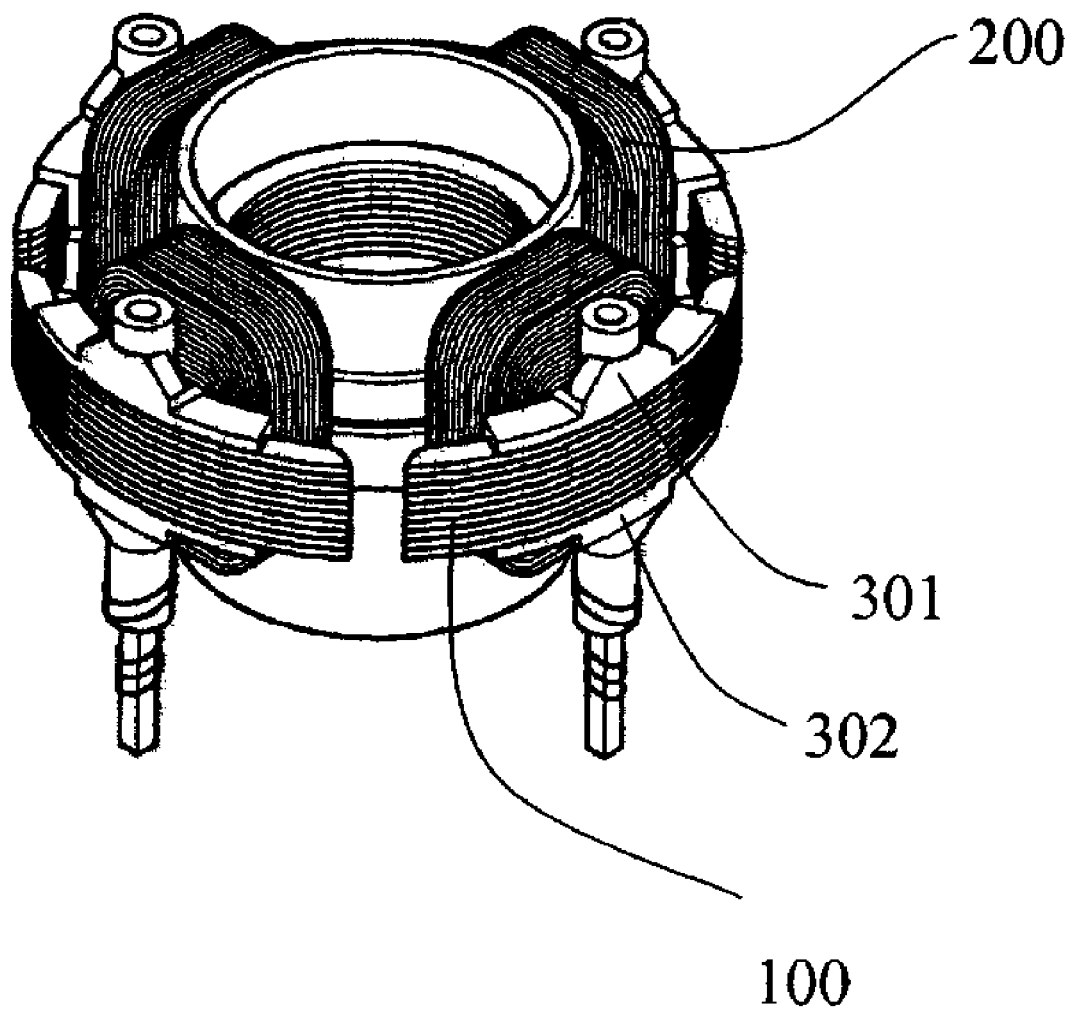
FIG. 5 is an isometric view of a stator in accordance with the conventional art.
Figure 6:
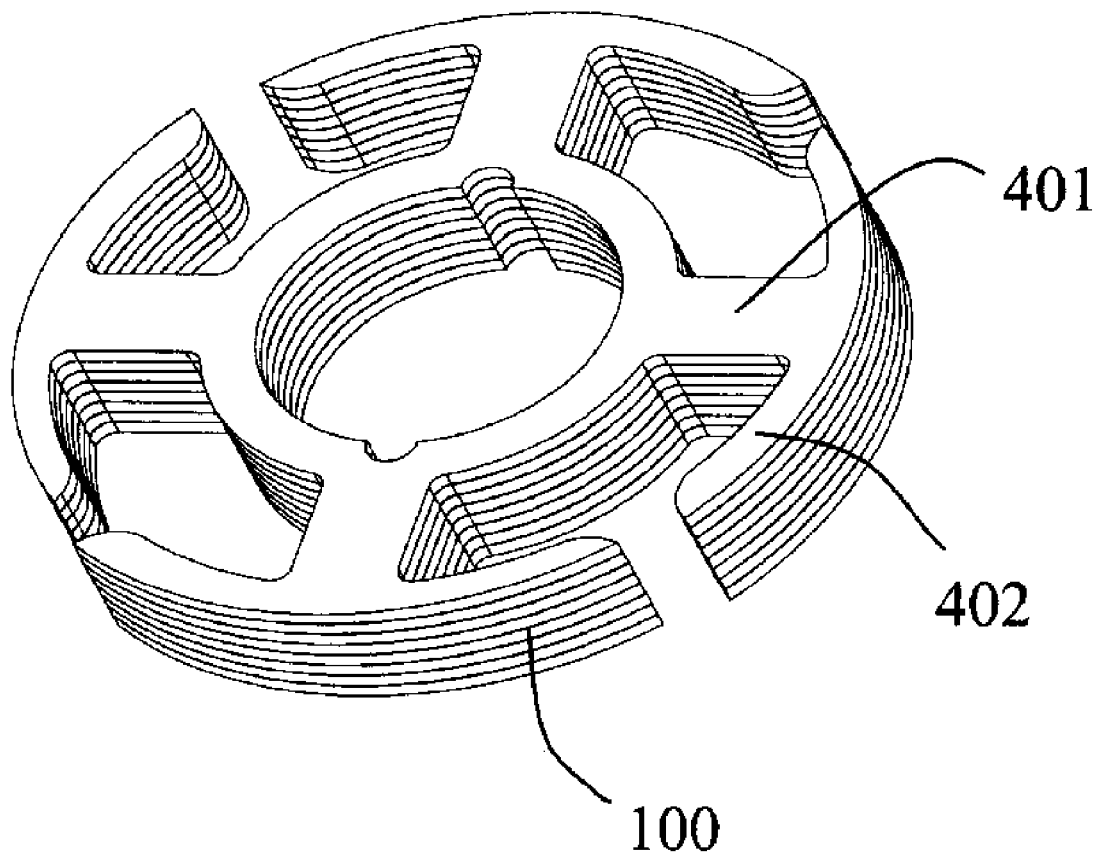
FIG. 6 is an isometric view of a stator core of the stator of FIG. 5.
Figure 7:
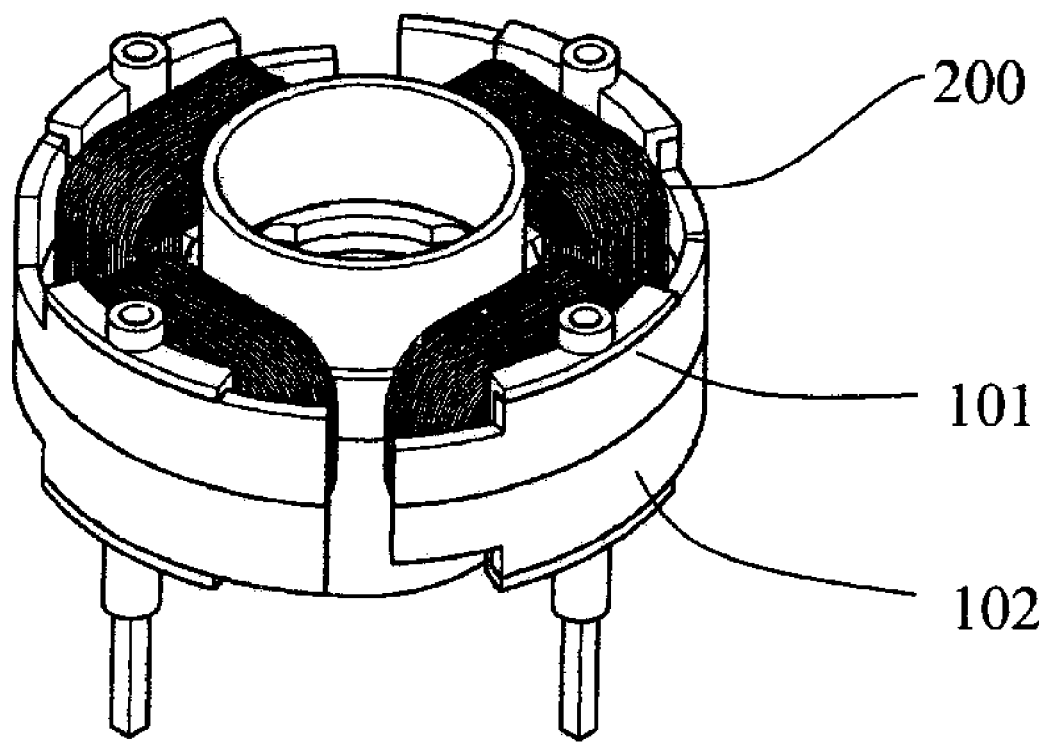
FIG. 7 is an isometric view of another kind of stator in accordance with the conventional art.

FIG. 4 schematically illustrates a further example of the ferromagnetic powder, in which multiple particles 10 are combined together by a binder 18 to form an enlarged particle 10b. Each of the particles 10 includes a magnetic central core 12 and a shell 14 enclosing the central core 12. In this preferred embodiment, the binder 18 and the shells 14 are made of the same material.

As the ferromagnetic powder described above is used to produce the stator core 500, the ferromagnetic powder is pressure molded at a high temperature, for example, in the range of 300 to 800 centigrade degrees. After the ferromagnetic powder is molded into a semi-finished product, the semi-finished product can be desirably annealed to release the strain induced during the pressure molding process to obtain a final product for the stator core 500. The magnetic core 12 and the magnetic layer 16 in the ferromagnetic powder provide the necessary magnetic property for the stator core 500, while the shell 14 or the binder 18 operates to improve a bonding strength between the particles 10 (10a, 10b) as the ferromagnetic powder is pressure molded into the stator core 500. The shell 14 or the binder 18 permits adjacent ferromagnetic particles 10 (10a, 10b) to strongly bond together. The shell 14 and the binder 18 also enhance insulation between adjacent ferromagnetic particles 10 (10a, 10b), thereby decreasing the eddy current loss for the stator core 500. Therefore, the stator core 500 integrally made from the above-illustrated ferromagnetic powder exhibits a high magnetic flux density, low eddy current loss, as well as high mechanical strength.

The integral stator core 500 made from the ferromagnetic powder can be suitably used as a substitute for conventional lamination cores prepared from laminated silicon steel sheets. Problems associated with conventional lamination cores are eliminated. By using the powder metallurgy process, the material yield is 100%, and it is possible to produce stator cores with relatively complex shapes. Forming the stator core 500 integrally by powder metallurgy also renders a large design freedom to the shape and configuration of the magnetic pole 505. For example, the magnetic pole 505 may be configured to have a particular shape and configuration according to a specific requirement so as to enhance the magnetic performance between the stator and the rotor within the brushless motor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motor stator comprising:
an integral stator core including a central cylinder and a plurality of posts extending radially outwardly from the central cylinder, each of the posts being connected with a magnetic pole at a free end thereof, the post having a smaller height dimension than the central cylinder and the magnetic pole whereby a recess is formed above the post between the central cylinder and the magnetic pole; and
a stator coil received in said recess and wound around the post.

2. The motor stator of claim 1, wherein the stator core is integrally made from ferromagnetic powder by powder metallurgy, at least one particle of the ferromagnetic powder having a central core of a magnetic material and an outer shell coated on the central core, the outer shell having a higher electrical resistance than the central core and being configured for providing a bonding strength between particles of the ferromagnetic powder.

3. The motor stator of claim 2, wherein the magnetic material for the central core is selected from a group consisting of soft magnetic metal, amorphous iron-based magnetic powder, pure iron powder, iron-based powder compositions and soft magnetic non-metal.

4. The motor stator of claim 2, wherein a material for the outer shell is selected from a group consisting of metal composite and piezoelectric material.

5. The motor stator of claim 2, wherein the outer shell is formed by precipitating a first kind of material out from a second kind of material, the first kind of material forming the outer shell, the second kind of material forming the central core.

6. The motor stator of claim 2, wherein the outer shell is formed by depositing a thin layer of film on an outer surface of the central core.

7. The motor stator of claim 6, wherein a material for the film is selected from a group consisting of ferrites, piezoelectric material, ferroelectric material and ceramic material.

8. The motor stator of claim 2, wherein the at least one particle further includes an additional shell surrounding the central core and the outer shell, a magnetic layer being sandwiched between the additional shell and the outer shell.

9. The motor stator of claim 2, wherein the at least one particle is combined together with at least one another particle by a binder to form an integral structure.

10. The motor stator of claim 1, wherein an outer surface of the stator core is coated with a layer of insulating material to insulate the stator coil from the stator core.

11. The motor stator of claim 1, wherein the magnetic pole extends away from the post along opposite directions and has a size gradually decreasing from a middle portion thereof adjacent to the post towards opposite ends of the magnetic pole.

12. A motor stator comprising a stator core, the stator core being slotted to define a plurality of posts wherein each of the posts has a magnetic pole at a free end thereof, the stator core being of a unitary, one-piece structure and being integrally formed from ferromagnetic powder by powder metallurgy, at least one particle of the ferromagnetic powder having a core-shell structure with a central core and an outer shell coated on the central core wherein the central core is configured for providing magnetic property for the stator core and the outer shell is configured for providing a bonding strength between particles of the ferromagnetic powder.

13. The motor stator of claim 12, wherein the stator core includes a central cylinder from which the posts extend, and the post has a smaller height dimension than the central cylinder and the magnetic pole.

14. The motor stator of claim 13, wherein a recess is defined above the post between the central cylinder and the magnetic pole, for receiving a stator coil therein.

* * * * *